(12) United States Patent
Sonda

(10) Patent No.: US 8,793,089 B2
(45) Date of Patent: Jul. 29, 2014

(54) METHOD FOR INSPECTING QUALITY OF GLASS PLATE

(75) Inventor: Yoshiyuki Sonda, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 539 days.

(21) Appl. No.: 13/197,298

(22) Filed: Aug. 3, 2011

(65) Prior Publication Data

US 2011/0288803 A1   Nov. 24, 2011

Related U.S. Application Data

(63) Continuation of application No. PCT/JP2010/051528, filed on Feb. 3, 2010.

(30) Foreign Application Priority Data

Feb. 3, 2009   (JP) ................................. 2009-022839

(51) Int. Cl.
  *G06F 19/00*   (2011.01)
  *G01B 21/20*   (2006.01)
(52) U.S. Cl.
  USPC .............................. 702/81; 356/514; 356/601
(58) Field of Classification Search
  CPC ......... G06F 19/00; G01B 21/20; G01B 11/24
  USPC .................. 702/81, 82, 84, 94; 700/108, 109; 356/489, 495, 511, 513, 514, 515, 601
  See application file for complete search history.

(56) References Cited

U.S. PATENT DOCUMENTS 7,589,844 B2     9/2009  Hirata et al.
2008/0316501 A1*  12/2008  Hirata et al. .................. 356/601

FOREIGN PATENT DOCUMENTS

| JP | 4-242103 | 8/1992 |
|----|----|----|
| JP | 10-279323 | 10/1998 |
| JP | 11-63906 | 3/1999 |
| JP | 2003-344041 | 12/2003 |
| WO | WO 2007/010875 A1 | 1/2007 |

OTHER PUBLICATIONS

International Search Report mailed on Apr. 13, 2010 in PCT/JP2010/051528 filed Feb. 3, 2010 (with English Translation of Categories).

* cited by examiner

*Primary Examiner* — John Breene
*Assistant Examiner* — Ruihua Zhang
(74) *Attorney, Agent, or Firm* — Oblon, Spivak, McClelland, Maier & Neustadt, L.L.P.

(57) ABSTRACT

The present invention provides a quality inspection method of a glass plate, which can predict the shape of the glass based on three types of design shape data C1, C2 and C3 of a glass plate in a state that it is placed on a three-point supporting type actual measurement inspection stand and an actual measurement shape data Y1 of the glass plate. The virtual errors $\Delta C2=C2-C1$, $\Delta C3=C3-C1$ and $\Delta Y1=Y1-C1$ at four supporting points of the glass plate are calculated, the correction amount $R=r(C3-C1)$ or the correction amount $R=r(C2-C1)$ is subtracted from $Y1-C1$ to calculate a value corresponding to a difference $Y2-A$ between a shape data $Y2$ of the glass on a desired actual measurement inspection stand and a design data A on the desired actual measurement inspection stand, and from the value corresponding to a difference $Y2-A$ and a quality standard, the quality of the glass plate is judged.

10 Claims, 12 Drawing Sheets

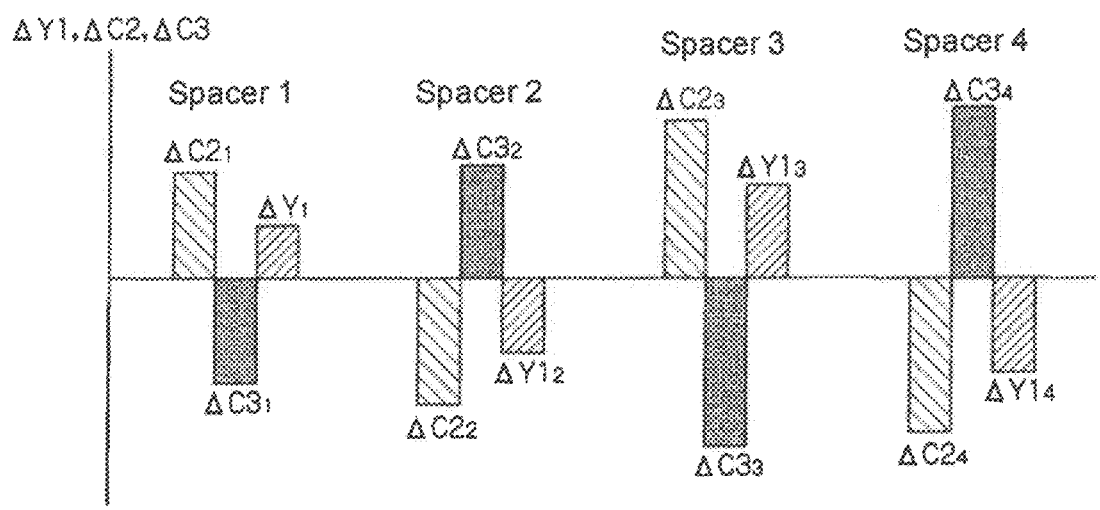

Fig. 14

|  | Spacer 1 | Spacer 2 | Spacer 3 | Spacer 4 |
|---|---|---|---|---|
| $\Delta Y1$ | -0.275651 | 0.237079 | 0.221536 | -0.202986 |
| $\Delta C2$ | 0.590957 | -0.59128 | -0.528734 | 0.528829 |
| $\Delta C3$ | -0.463832 | 0.464061 | 0.415031 | -0.415242 |

Fig. 15

|  | Spacer 1 | Spacer 2 | Spacer 3 | Spacer 4 |
|---|---|---|---|---|
| $\Delta Y1 / \Delta C3$ | 0.5942906 | 0.510879 | 0.5337818 | 0.4888378 |

Average r of ratios   0.5319473

Fig. 16

|  | Evaluation point 1 | Evaluation point 2 | Evaluation point 3 | Evaluation point 4 | Evaluation point 5 |
|---|---|---|---|---|---|
| $r(C3-C1)$ | 0.223962 | 0.169787 | 0.110804 | 0.051755 | -0.006772 |

|  | Evaluation point 6 | Evaluation point 7 | Evaluation point 8 | Evaluation point 9 | Evaluation point 10 |
|---|---|---|---|---|---|
|  | -0.063979 | -0.118754 | -0.170227 | -0.217796 | -0.249515 |

|  | Evaluation point 11 | Evaluation point 12 | Evaluation point 13 | Evaluation point 14 | Evaluation point 15 |
|---|---|---|---|---|---|
|  | -0.202524 | -0.107768 | -0.010089 | 0.089551 | 0.1911 |

|  | Evaluation point 16 | Evaluation point 17 | Evaluation point 18 | Evaluation point 19 | Evaluation point 20 |
|---|---|---|---|---|---|
|  | 0.250096 | 0.008591 | -0.051527 | -0.223639 | -0.129887 |

|  | Evaluation point 21 | Evaluation point 22 | Evaluation point 23 |
|---|---|---|---|
|  | -0.03276 | 0.068318 | 0.171263 |

Fig. 17

| | Evaluation point 1 | Evaluation point 2 | Evaluation point 3 | Evaluation point 4 | Evaluation point 5 |
|---|---|---|---|---|---|
| Shape | 0.005593 | 0.222035 | 0.276817 | 0.169194 | 0.156355 |

| | Evaluation point 6 | Evaluation point 7 | Evaluation point 8 | Evaluation point 9 | Evaluation point 10 |
|---|---|---|---|---|---|
| | 0.260362 | 0.43815 | 0.529753 | 0.352779 | −0.052533 |

| | Evaluation point 11 | Evaluation point 12 | Evaluation point 13 | Evaluation point 14 | Evaluation point 15 |
|---|---|---|---|---|---|
| | 0.091954 | −0.085919 | −0.357148 | −0.230705 | 0.041089 |

| | Evaluation point 16 | Evaluation point 17 | Evaluation point 18 | Evaluation point 19 | Evaluation point 20 |
|---|---|---|---|---|---|
| | −0.017816 | −0.449288 | −0.514441 | 0.020284 | −0.343205 |

| | Evaluation point 21 | Evaluation point 22 | Evaluation point 23 |
|---|---|---|---|
| | −0.401835 | −0.152175 | −0.001248 |

|  | ΔC2 | ΔY1 |  | Ratio |  |
|---|---|---|---|---|---|
| spacer1 | −0.30216 | −0.14301 |  | 0.473289 |  |
| spacer2 | 0.741379 | 0.344717 |  | 0.464967 |  |
| spacer3 | −0.74397 | −0.37599 |  | 0.505383 |  |
| spacer4 | 0.308017 | 0.177663 |  | 0.576796 |  |
|  |  |  |  |  |  |
|  |  |  |  | 0.505109 | Average of ratios |

METHOD FOR INSPECTING QUALITY OF GLASS PLATE

TECHNICAL FIELD

The present invention relates to a quality inspection method of a glass plate, in particular, to a quality inspection method suitable for inspecting the shape of an automotive window glass.

BACKGROUND ART

Heretofore, for window glasses for automobiles, ones having various curved shapes accommodated to designs of automobiles, are employed. These window glasses are produced by cutting a plate-shaped glass plate produced by e.g. a float method into a desired shape, heating and softening it and bending it by e.g. a press-forming. For a side window or a rear window, a tempered glass is commonly used, and by immediately air-cooling a heated glass plate after bending, a so-called tempered glass is produced.

Meanwhile, a laminated glass to be employed for windshields is a layered product constituted by two glass plates cut out to have substantially the same shape and a resin interlayer sandwiched therebetween. In general, a laminated glass is produced by placing two glass plates on a ring-shaped jig so that they are overlaid, and heating them in a furnace to bent them into a desired curved shape by their own weight. After the bending, they are gradually cooled without being air-cooled for tempering, as differently from the case of tempered glass. Thereafter, an interlayer (such as polyvinyl butyral) is sandwiched between the bent two glass plates, a pre-pressing treatment in a vacuum bag and subsequent heating and pressurizing treatments in an autoclave are carried out to produce a laminated glass in which the glass plates and the interlayer are laminated.

When a curved glass thus produced is assembled into an automobile, high shape reproducibility is required. In a case of door glass which is slidable up and down by an operation of a driver/passenger to close or open the window, a predetermined reproducibility of design shape is required. If reproducibility of the shape is poor, the glass may be collided or frictioned with e.g. metallic members to be damaged when it is slid. Further, in a case of fixed window such as a windshield or a rear window, if the reproducibility of the shape is poor, it becomes difficult to attach the glass to an opening. As a result, see-through distortion (a phenomenon that an image through a glass is distorted) or a reflection distortion (a phenomenon that an image reflected by a glass surface is distorted) may occur as a problem unique to window glasses.

To cope with these problems, heretofore, a glass plate after bending has been placed on an actual measurement inspection stand (refer to e.g. Patent Document 1) called as a gauge to carry out shape inspection, and only glass plates having a predetermined shape accuracy have been employed for production of automobiles. Such a gauge is an inspection mold having a shape formed so as to fit to a predetermined design shape of a glass attached for use, and a plurality of distance sensors are embedded in an inspection plane of the gauge. By measuring the distance from the surface of the mold to a rear surface of a glass plate, displacement of the shape of the glass plate from its design shape, is measured to evaluate the accuracy of the shape. Heretofore, an inspection using such a gauge has been carried out with respect to all or sampled formed glass plates.

However, in an inspection using a gauge, a step of placing a glass plate is required for every single glass plate, whereby improvement of productivity is limited. Further, since it is necessary to prepare a gauge for every model of final product, a large number of gauges are required to cope with production of recent various types of automobiles. Further, since such a gauge has a size equal or larger than a window glass, there is such a problem that a wide space is required to store a large number of gauges prepared for every model. There is also a problem that these gauges need to be stored for a long time considering repairment purpose in the future.

To cope with these problems, the present inventors have provided a shape inspection method solving the above problems in Patent Document 2.

This inspection method comprises a first step of calculating shape data of a glass plate in a weightless state based on actual measurement data of the glass plate in a state that the glass plate is placed on a universal inspection stand having three universal supporting points (refer to FIG. 3: universal inspection stand 110), a second step of calculating virtual shape data of the glass plate in a state that the glass plate is virtually placed on an actual measurement inspection stand (refer to FIG. 6: predetermined inspection stand 130), based on the shape data of the glass plate in a weightless state, a third step of placing the glass plate on the actual measurement inspection stand, a fourth step of obtaining information of actual measurement inspection data of the glass plate placed on the actual measurement inspection stand, and a fifth step of judging the quality of the glass plate based on the virtual shape data of the glass plate in a stat that the glass plate is placed on the actual measurement inspection stand and the information of the actual measurement shape data of the glass plate on the actual measurement inspection stand.

In the invention of Patent Document 2, by simulating the shape of a glass plate in a weightless state from the shape of the glass plate actually measured, it is possible to judge the shape quality of the glass plate without having influence of deflection caused by gravity. Further, by simulating a state in which the glass plate is placed on a predetermined inspection stand from the shape of the glass plate in the weightless state, it is possible to simulate inspections of the glass plate using these actual measurement inspection stands without actually preparing these actual measurement inspection stands. Further, since the universal inspection stand provided with the first, the second and the third supporting portions for supporting a glass plate, is an inspection stand of three point supporting type, which can always support the glass plate regardless of the shape of the glass plate, the inspection stand can be universally used.

PRIOR ART DOCUMENTS

Patent Documents

Patent Document 1: JP-A-4-242103
Patent Document 2: WO2007/010875 A1

DISCLOSURE OF INVENTION

Technical Problem

By the way, in the above shape inspection method, it is necessary to carry out a simulation calculation of a shape at every time of obtaining a virtual shape data on an actual measurement inspection stand from an actual measurement data on a universal inspection stand. However, there has been a problem that the load of this simulation calculation of the shape is large and the inspection takes a long time. Under the circumstances, it is an object of the present invention to make it possible to predict a shape data on an actual inspection stand from a shape data on a universal inspection stand without carrying out a simulation of shape during the inspection, and to inspect the shape quality of a glass plate.

Further, an actual measurement inspection stand employed for conventional inspection step of glass plates is prepared for each product shape as a rule, and the actual measurement inspection stands include not only ones having three supporting points but also ones having four supporting points depending on product shape. It is another object of the present invention to provide an inspection method of the shape quality and a quality inspection program for a glass plate, which makes it possible to easily predict a shape of a glass plate on such an actual measurement inspection stand having four supporting points from a shape of a glass plate on a universal inspection stand having three supporting points.

Solution to Problem

In order to achieve the above objects, the present invention provides a method for inspecting the quality of a glass plate, which is a method of judging the quality from a design data of a glass plate attached for use as a window glass, and a shape data of a measured glass plate; the method comprising:

a first step of setting a first design data A representing the shape of the attached glass plate, a first weight pattern being one main weight pattern and second and third weight patterns being sub weight patterns on four actual measurement weight supporting points corresponding to weight supporting points of the actual measurement inspection stand selected according to the shape of the attached glass plate;

a second step of calculating second design data B, that are B1, B2 and B3 corresponding to the first, second and third weight patterns, respectively, of the shape of the glass plate in weightless state in which effect of flexion due to gravity is excluded, based on the first design data A and the first, second and third weight patterns;

a third step of calculating third design data C, that are C1, C2 and C3 corresponding to the first, second and third weight patterns, respectively, of the shape of the glass plate in a state that the glass plate is virtually placed on a universal inspection stand having three universal supporting points, based on the second design data B;

a fourth step of calculating the position data $C1_1$ to $C1_4$, $C2_1$ to $C2_4$ and $C3_1$ to $C3_4$ of four actual measurement supporting points of the third design data C corresponding to the weight patterns;

a fifth step of calculating two position vectors $\Delta C2 = C2_x - C1_x$ and $\Delta C3 = C3_x - C1_x$ (where x is 1, 2, 3 or 4 that is a suffix representing a supporting position; this rule is applied hereinafter) from the position data $C1_x$, $C2_x$ and $C3_x$;

a sixth step of measuring a first actual measurement data Y1 of a glass plate to be measured that is placed on a universal inspection stand having three universal supporting points;

a seventh step of calculating position data $Y1_1$ to $Y1_4$ of four actual measurement supporting points in the first actual measurement data Y1;

an eighth step of calculating a position vector $\Delta Y1 = Y1_x - C1_x$ from the position data $C1_x$ and $Y1_x$;

a ninth step of comparing $\Delta Y1$ with $\Delta C2$ and $\Delta C3$, judging which of the second weight pattern and the third weight pattern is closer to the weight pattern of Y1 based on the degree of agreement of the signs of the vectors to judge a unique weight pattern and determining the sign of the vector;

a tenth step of calculating the ratio r of $\Delta Y1$ to the position vector $\Delta C2$ or $\Delta C3$ that is determined by the unique weight pattern;

an eleventh step of obtaining a shape correction amounts $R = r(C2-C1)$ or a shape correction amount $R = r(C3-C1)$ for obtaining position data of points other than the measurement points in a case of virtually placing the glass plate to be inspected on the actual measurement inspection stand, based on the first actual measurement data Y1 and the unique weight pattern;

a twelfth step of calculating a value corresponding to a difference Y2-A between a second actual measurement data Y2 and the first design data A at a desired inspection point of the glass plate to be inspected placed on the actual measurement inspection stand, by subtracting the shape correction amount R from the difference Y1-C1 obtained by subtracting the third design data C1 of the glass plate that is virtually placed with the first weight pattern, that is the main weight pattern from the first actual measurement data Y1; and a thirteenth step of judging the quality of the glass plate based on the value corresponding to Y2-A calculated above and a quality standard.

The present invention is a quality inspection method of a glass plate in a case having a first weight pattern being one main weight pattern and second and third weight patterns being sub weight patterns.

Further, in order to achieve the above objects, the present invention provides a method for inspecting the quality of a glass plate, which is a method of judging the quality from a design data of a glass plate attached for use as a window glass, and a shape data of a measured glass plate; the method comprising:

a first step of setting a first design data A representing the shape of the attached glass plate, a first weight pattern being one main weight pattern and a second weight pattern being a sub weight pattern on four actual measurement weight supporting points corresponding to weight supporting points of the actual measurement inspection stand selected according to the shape of the attached glass plate;

a second step of calculating second design data B, that are B1 and B2 corresponding to the first and second weight patterns, respectively, of the shape of the glass plate in weightless state in which effect of flexion due to gravity is excluded, based on the first design data A and the first and second weight patterns;

a third step of calculating third design data C, that are C1 and C2 corresponding to the first and second weight patterns, respectively, of the shape of the glass plate in a state that the glass plate is virtually placed on a universal inspection stand having three universal supporting points, based on the second design data B;

a fourth step of calculating the position data $C1_1$ to $C1_4$ and $C2_1$ to $C2_4$ of four actual measurement supporting points of the third design data C corresponding to the weight patterns;

a fifth step of calculating a position vector $\Delta C2 = C2_x - C1_x$ (where x is 1, 2, 3 or 4 that is a suffix representing a supporting position; this rule is applied hereinafter) from the position data $C1_x$ and $C2_x$;

a sixth step of measuring a first actual measurement data Y1 of a glass plate to be measured that is placed on a universal inspection stand having three universal supporting points;

a seventh step of calculating position data $Y1_1$ to $Y1_4$ of four actual measurement supporting points in the first actual measurement data Y1;

an eighth step of calculating a position vector $\Delta Y1 = Y1_x - C1_x$ from the position data $C1_x$ and $Y1_x$;

a ninth step of calculating a ratio r of $\Delta Y1$ to $\Delta C2$;

a tenth step of obtaining a shape correction amount $R = r(C2-C1)$ for obtaining position data of the measurement points in a case of virtually placing the glass plate to be inspected on the actual measurement inspection stand, based on the first actual measurement data Y1 and the second weight pattern;

an eleventh step of calculating a value corresponding to a difference Y2−A between a second actual measurement data Y2 and the first design data A at a desired inspection point of the glass plate to be inspected placed on the actual measurement inspection stand, by subtracting the shape correction amount R from the difference Y1−C1 obtained by subtracting the third design data C1 of the glass plate that is virtually placed with the first weight pattern that is a main weight pattern, from the first actual measurement data Y1; and a twelfth step of judging the quality of the glass plate based on the value corresponding to Y2−A calculated above and a quality standard.

The present invention is a quality inspection method of a glass plate in a case having a first weight pattern being one main weight pattern and a second weight pattern being one sub weight pattern.

Further, in the present invention, it is preferred that the main first weight pattern is one wherein weights are applied on all of four supporting points of the actual measurement inspection stand, and the sub weight patterns include at least one weight distribution wherein weights are applied on only three supporting points of the four supporting points.

Further, in the present invention, the glass plate is preferably an automotive window glass. Further, by the quality inspection program of a glass plate having the above mentioned steps, it becomes possible to suitably carried out the inspection method of the present invention by employing a computer.

Further, it becomes possible to carry out a calculation using only the following steps in the above-mentioned steps, and to calculate from the calculation result and a design data of a glass plate a virtual design data, and thereby to calculate the shape.

Specifically, the present invention provides a method for measuring the shape of a glass plate, which is a method for calculating a shape data of a glass plate placed on an actual measurement inspection stand by using a design data of the glass plate attached for use as a window glass; the method comprising:

a first step of setting a first design data A representing the shape of the attached glass plate, a first weight pattern being one main weight pattern and second and third weight patterns being sub weight patterns on four actual measurement weight to supporting points corresponding to weight supporting points of the actual measurement inspection stand selected according to the shape of the attached glass plate;

a second step of calculating second design data B, that are B1, B2 and B3 corresponding to the first, second and third weight patterns, respectively, of the shape of the glass plate in weightless state in which effect of flexion due to gravity is excluded, based on the first design data A and the first, second and third weight patterns;

a third step of calculating third design data C, that are C1, C2 and C3 corresponding to the first, second and third weight patterns, respectively, of the shape of the glass plate in a state that the glass plate is virtually placed on a universal inspection stand having three universal supporting points, based on the second design data B;

a fourth step of calculating the position data $C1_1$ to $C1_4$, $C2_1$ to $C2_4$ and $C3_1$ to $C3_4$ of four actual measurement supporting points of the third design data C corresponding to the weight patterns;

a fifth step of calculating two position vectors $\Delta C2 = C2_x - C1_x$ and $\Delta C3 = C3_x - C1_x$ (where x is 1, 2, 3 or 4 that is a suffix representing a supporting position; this rule is applied hereinafter) from the position data $C1_x$, $C2_x$ and $C3_x$;

a sixth step of measuring a first actual measurement data Y1 of a glass plate to be measured that is placed on a universal inspection stand having three universal supporting points;

a seventh step of calculating position data $Y1_1$ to $Y1_4$ of four actual measurement supporting points in the first actual measurement data Y1;

an eighth step of calculating a position vector $\Delta Y1 = Y1_x - C1_x$ from the position data $C1_x$ and $Y1_x$;

a ninth step of comparing $\Delta Y1$ with $\Delta C2$ and $\Delta C3$, judging which of the second weight pattern and the third weight pattern is closer to the weight pattern of Y1 based on the degree of agreement of the signs of the vectors to judge a unique weight pattern and determining the sign of the vector;

a tenth step of calculating the ratio r of $\Delta Y1$ to the position vector $\Delta C2$ or $\Delta C3$ that is determined by the unique weight pattern; and an eleventh step of obtaining a shape correction amount $R = r(C2 - C1)$ or a shape correction amount $R = r(C3 - C1)$ for obtaining position data of the measurement points in a case of virtually placing the glass plate to be inspected on the actual measurement inspection stand, based on the first actual measurement data Y1 and the unique weight pattern; and a twelfth step of calculating a second actual measurement data Y2 at a desired inspection point of the glass plate to be inspected placed on the actual measurement inspection stand, by subtracting the third design data C1 of the glass plate that is virtually placed with the first weight pattern, that is the main weight pattern, from the first actual measurement data Y1 to obtain the difference Y1−C1, adding the first design data A to the difference Y1−C1 and subtracting the shape correction amount R from Y1−C1+A.

Further, the present invention provides a method for measuring the shape of a glass plate, which is a method for calculating a shape data of a glass plate placed on an actual measurement inspection stand by using a design data of the glass plate attached for use as a window glass; the method comprising:

a first step of setting a first design data A representing the shape of the attached glass plate, a first weight pattern being one main weight pattern and a second weight pattern being a sub weight pattern on four actual measurement weight supporting points corresponding to weight supporting points of the actual measurement inspection stand selected according to the shape of the attached glass plate;

a second step of calculating second design data B, that are B1 and B2 corresponding to the first and second weight patterns, respectively, of the shape of the glass plate in weightless state in which effect of flexion due to gravity is excluded, based on the first design data A and the first and second weight patterns;

a third step of calculating third design data C, that are C1 and C2 corresponding to the first and second weight patterns, respectively, of the shape of the glass plate in a state that the glass plate is virtually placed on a universal inspection stand having three universal supporting points, based on the second design data B;

a fourth step of calculating the position data $C1_1$ to $C1_4$ and $C2_1$ to $C2_4$ of four actual measurement supporting points of the third design data C corresponding to the weight patterns;

a fifth step of calculating a position vector $\Delta C2 = C2_x - C1_x$ (where x is 1, 2, 3 or 4 that is a suffix representing a supporting position; this rule is applied hereinafter) from the position data $C1_x$ and $C2_x$;

a sixth step of measuring a first actual measurement data Y1 of a glass plate to be measured that is placed on a universal inspection stand having three universal supporting points;

a seventh step of calculating position data $Y1_1$ to $Y1_4$ of four actual measurement supporting points in the first actual measurement data Y1;

an eighth step of calculating a position vector $\Delta Y1 = Y1_x - C1_x$ from the position data $C1_x$ and a ninth step of calculating a ratio r of $\Delta Y1$ to $\Delta C2$;

a tenth step of obtaining a shape correction amount $R=r(C2-C1)$ for obtaining position data of the measurement points in a case of virtually placing the glass plate to be inspected on the actual measurement inspection stand, based on the first actual measurement data Y1 and the second weight pattern; and a eleventh step of calculating a second actual measurement data Y2 at a desired inspection point of the glass plate to be inspected placed on the actual measurement inspection stand, by subtracting the third design data C1 of the glass plate that is virtually placed with the first weight pattern, that is the main weight pattern, from/tie first actual measurement data Y1 to obtain the difference Y1−C1, adding the first design data A to the difference Y1−C1 and subtracting the shape correction amount R from Y1−C1+A.

Here, the constituent features described in the claims are defined as follows.

The first design data A is a numerical data of e.g. CAD of a pattern, that is a design shape data of a glass plate attached for use.

The second design data B is a design shape data in a weightless state.

The third design data C is a design shape data of a glass plate virtually placed on a four-point actual measurement inspection stand. Further, the quality standard is a standard for judging pass or fail according to the quality specification of the product shape, and in the present invention, this term indicates a judgment standard based on a quality specification of a product shape on a four-point actual measurement inspection stand. This quality standard can be applied to an actual measurement inspection standard that has been used heretofore. Further, it is also possible to measure the shapes of a plurality of glass plates whose design shapes are unknown to set a new quality standard from the measurement result, and to use the quality standard for judgment.

The first actual measurement data Y1 is an actual measurement shape data of an actual glass plate to be inspected that is placed on a three-point supporting type universal inspection stand.

The second actual measurement data Y2 is a shape data of the glass plate to be inspected that is virtually placed on a four-point supporting type actual measurement inspection stand.

The main weight pattern is a weight pattern wherein a weight of a glass plate is applied on four points.

The first sub weight pattern is a weight pattern wherein one point of the four points is in a state of only in contact.

The second sub weight pattern is a weight pattern wherein another one point in the four points is in a state of only in contact.

The universal inspection stand of three-point supporting type is an inspection stand of three-point supporting type that is usable for all glass plates.

The actual measurement inspection stand of four-point supporting type is an inspection stand of four-point supporting type that is actually employed in inspection sites, that is an inspection stand capable of appropriately measuring a specific shape.

Effects of Invention

By the present invention, it is possible to predict a glass plate shape on an actual measurement inspection stand of four-point supporting type within a short time from a glass plate shape on a universal measurement inspection stand of three-point supporting type without carrying out a simulation of the shape every time of inspection. Further, it is also possible to realize an inspection method of a product shape quality of a glass plate employing the shape prediction result. Further, the inspection method can be suitably carried out by using a computer.

BRIEF EXPLANATION OF DRAWINGS

FIG. 10(*b*) is a plan view showing a stripe pattern appeared when the blue component is observed.

FIG. 11 is an explanation view showing the degree of agreement of the sign of vector $\Delta Y1$ with C2 or C3 and judgment as to which of C2 and C3 is closer to $\Delta Y1$.

FIG. 12 is a table showing the values of $\Delta C2$ and $\Delta C3$ at each of four supporting points.

FIG. 13 is a table showing the value of $\Delta Y1$ at each of four supporting points.

FIG. 14 is a table showing that Y1 is close to the pattern of C3.

FIG. 15 is a table showing the average of the ratios of $\Delta Y1$ to $\Delta C3$.

FIG. 16 is a table showing correction amounts at evaluation points 1 to 23.

FIG. 17 is a table showing shape data at evaluation points 1 to 23.

DESCRIPTION OF EMBODIMENTS

Figure 1:
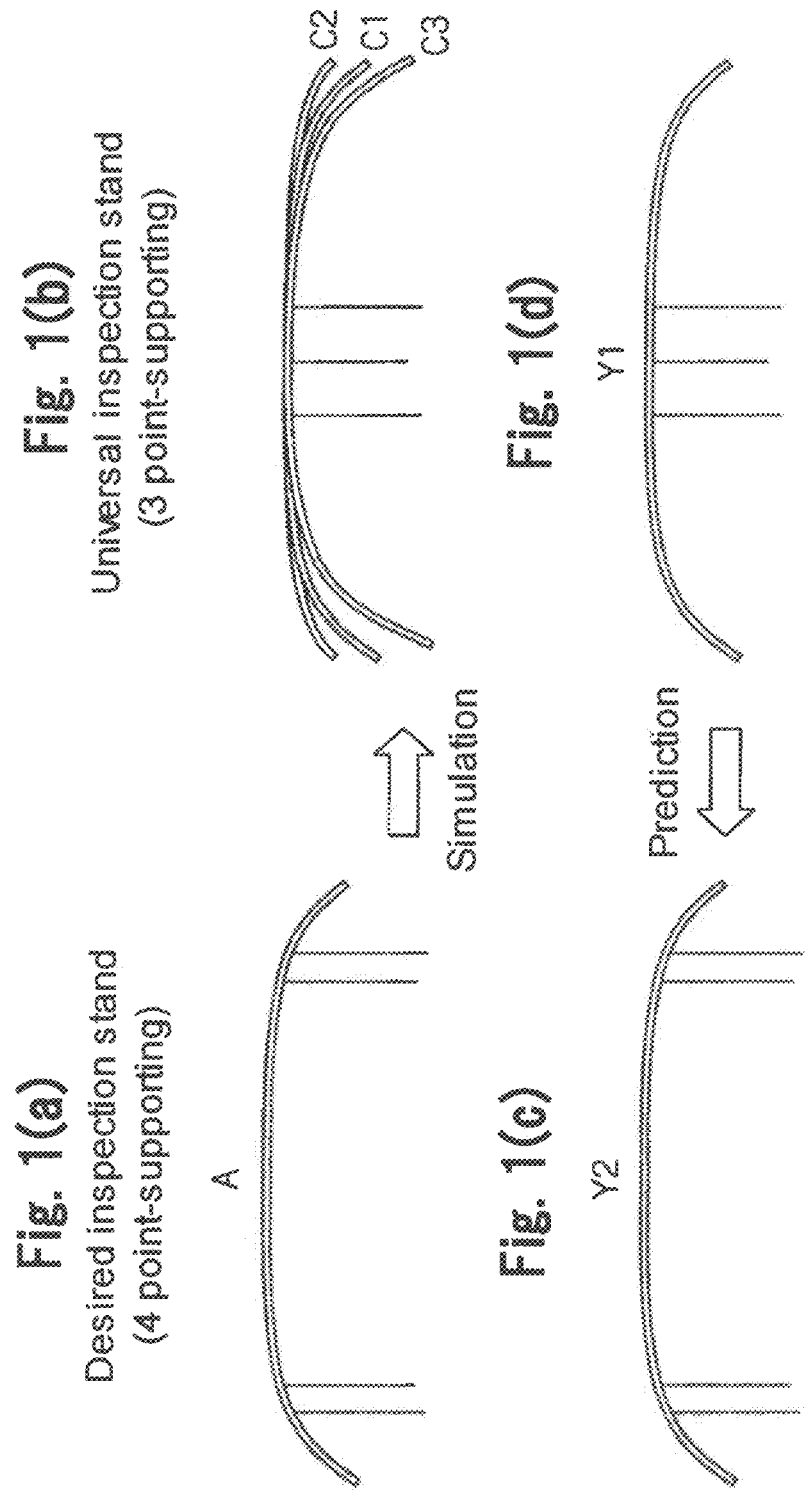
FIG. 1 is an explanation view showing an example of the shape of a glass plate.

Now, preferred embodiments of the quality inspection method and the quality inspection program of a glass plate according to the present invention will be described with reference to attached drawings using an automotive window glass as an example.

First, a concept of prediction of the shape of a glass plate on a four-point supporting type actual measurement inspection stand from the shape of the glass plate on a three-point supporting type universal inspection stand, will be explained. Here, supporting positions defined by spacers of the four-point supporting type actual measurement inspection stand are arranged so as to form a substantially rectangular shape, and the positions can be changed according to a glass to be supported. Meanwhile, the supporting positions defined by spacers of the three-point supporting type universal inspection stand are fixed regardless of the shape or the type of glass plate.

FIG. 1(a) schematically shows the shape of a glass plate having a design shape supported on a desired four-point supporting type actual measurement inspection stand, that is the shape of a glass plate having a desired shape according to a first design data A.

Further, FIG. 1(b) shows three typical weight patterns on a four-point supporting type inspection stand. The shape of a glass plate C1 is a shape obtained from a simulation in which a glass plate A having a desired shape according to a first design data A being a main weight pattern (first weight pattern) is supported on a three-point supporting type universal inspection stand. In this case, when the glass plate A is placed on the four-point supporting type actual measurement inspection stand, the glass plate A is supported evenly by all of four supporting points. The shape of a glass plate C2 is a shape obtained from a simulation in which the glass plate A obtained with a weight pattern supported only by three points among four supporting points (second weight pattern), is supported on the three-point supporting type universal inspection stand. In this case, the shape deviates from the desired shape defined by the first design data A, and is supported by diagonal two points and a point among the other diagonal two points in the four points. The shape of a glass plate C3 is a shape obtained from a simulation in which the glass plate A obtained with a weight pattern supported only by three points of another combination among four supporting points (third weight pattern) is supported on a three-point supporting type universal inspection stand. In this case, in the same manner as above, the shape deviates from the desired shape defined by the first designed data A, and is supported by two diagonal points of the other combination and one point among one set of diagonal two points.

Further, FIG. 1(c) shows the shape of a real glass plate Y2 that is supported on a desired four-point supporting type actual measurement inspection stand.

Furthermore, FIG. 1(d) shows the shape of a glass plate Y1, that is the shape of a real glass plate Y2 supported on a three-point supporting type universal inspection stand.

Figure 2:
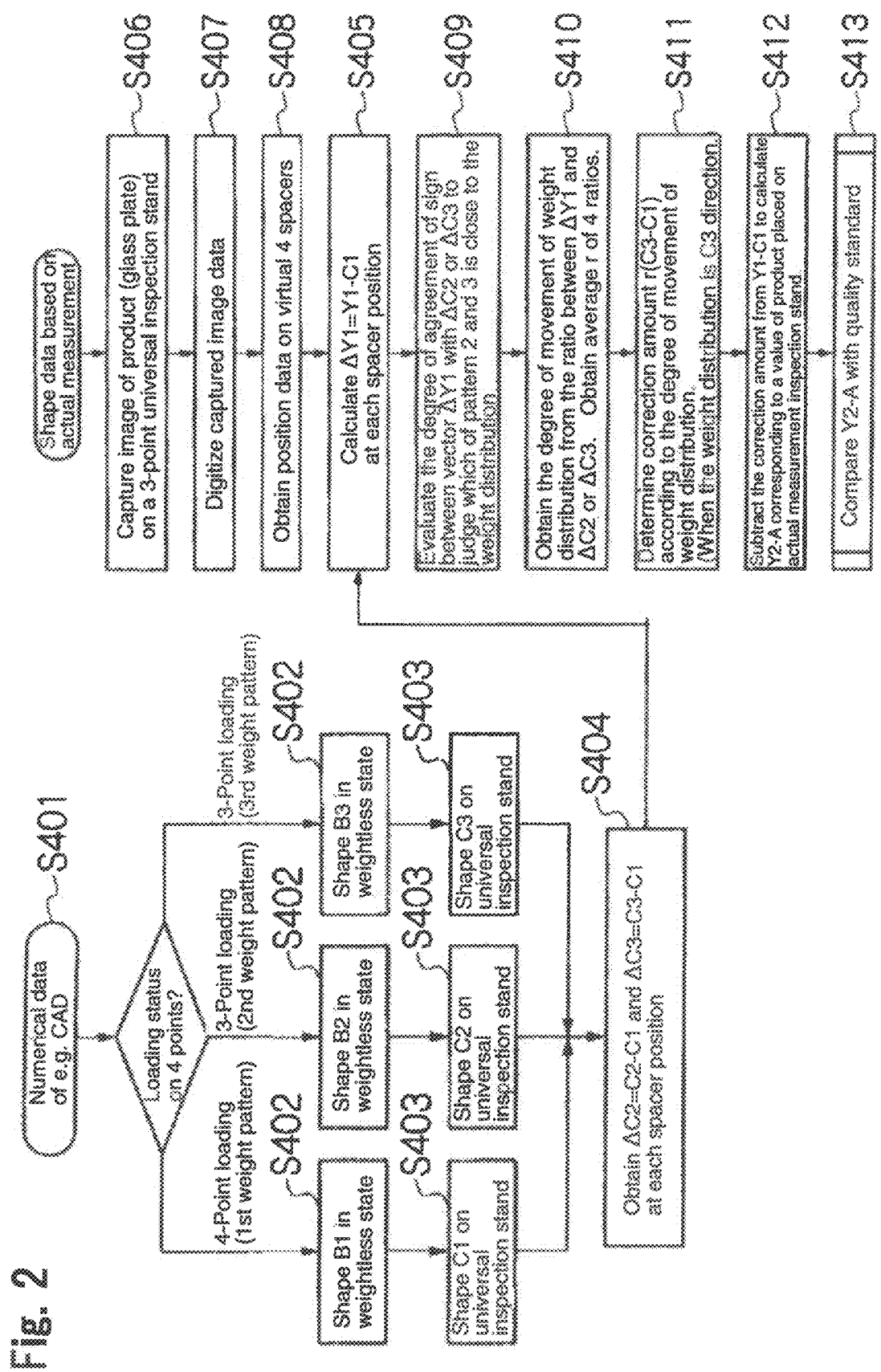
FIG. 2 is a flowchart showing the procedure of the quality inspection method of an embodiment.

Here, the shapes of the glass plates C1, C2 and C3 shown in FIG. 1(b) are, as shown in the flowchart of FIG. 2, obtainable by preparing first to third weight patterns of the design (CAD) data of a glass plate in a state that it is supported on a desired four-point supporting type actual measurement inspection stand (step (S) 401), calculating the design shape data (second design data B1, B2 and B3) of the glass plate A in weightless state based on the weight patterns (step (S) 402), and calculating the design shape data (third design data C1, C2 and C3) of the glass plate A in a state it is placed on a three-point supporting type universal inspection stand based on the design shape data of the glass plate A in weightless state (step (S) 403).

Here, in conventional shape inspections, inspection is carried out based on the difference between the glass plate Y2 and the glass plate A shown in FIG. 1. It would be good if the same inspection can be made with the glass plate Y1 and the glass plate C1, but such an inspection is not preferred since an error due to the weight distribution of four-point supporting is included. Accordingly, by removing the error, it is possible to predict the shape of the glass plate on the four-point supporting type actual measurement inspection stand from the shape of the glass plate on the three-point supporting type universal inspection stand. Further, the above error can be obtained by the shape information of the glass plate Y1 itself.

The concept of the method of removing the error will be explained. Here, Y1 indicates the glass plate Y1, C1 indicates the glass plate C1, Y2 indicates the glass plate Y2, and A indicates the glass plate A.

$$Y1-C1=Y2-A+E$$

E: Inspection error when the weight distribution of a glass plate is shifted toward a state that the weight is applied to three points (C2 or C3).

Here, as an information to know the error, as in step (S) 404 in FIG. 2, it becomes necessary to obtain virtual errors $\Delta C2=C2-C1$ and $\Delta C3=C3-C1$ at four supporting points formed by the spacers, and thereafter, obtain a virtual error $\Delta Y1=Y1-C1$ at each of four supporting points formed by the spacers as in step (S) 405.

FIG. 12 shows an example of the values $\Delta C2$ and $\Delta C3$ at four spacers (x=1 to 4), and FIG. 13 shows an example of the value of $\Delta Y1$ at the supporting positions formed by four spacers (x=1 to 4).

Further, here, data (position data $C1_1$ to $C1_4$, $C2_1$ to $C2_4$ and $C3_1$ to $C3_4$) of four supporting positions supported by virtual spacers for each of third design data C1, C2 and C3 are calculated to obtain virtual errors $\Delta C2=C2-C1$ and $\Delta C3=C3-C1$ of step (S) 404 in advance. Meanwhile, position data $Y1_1$ to $Y1_4$ of a glass plate to be measured can be obtained by a step of capturing an image of a product glass plate supported on a three-point supporting type universal inspection stand (step (S) 406), a step of converting the captured image data into a numerical data (step (S) 407) and a step of obtaining position data on four supporting positions formed by virtual spacers (step (S) 408).

Next, an example of the method for obtaining the position data will be described.

Figure 3:
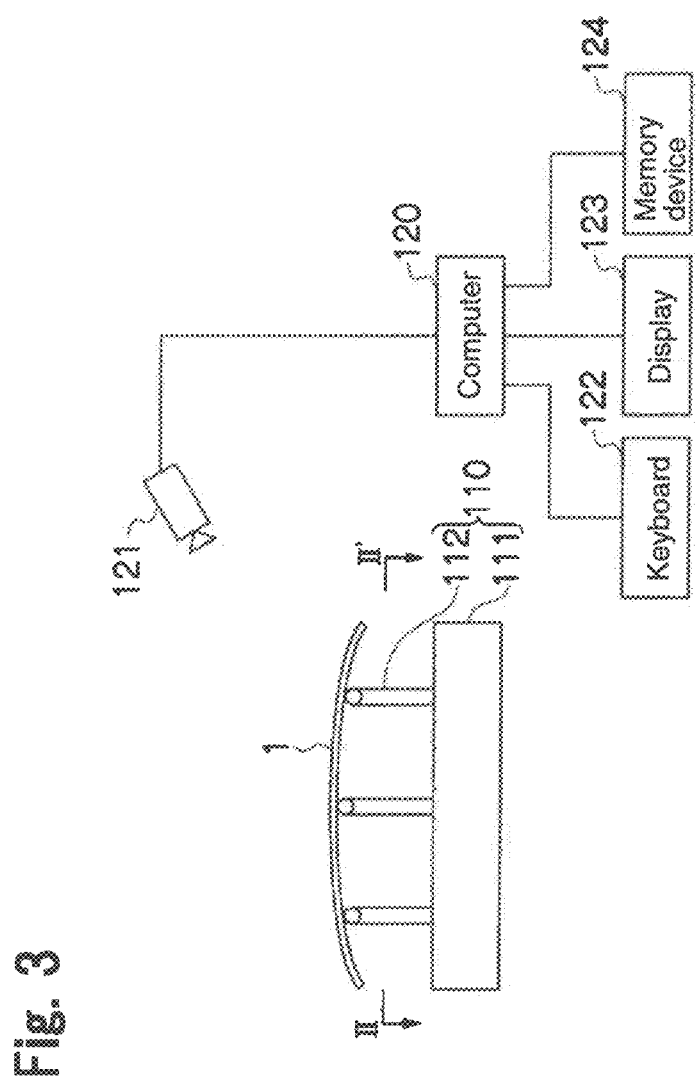
FIG. 3 is an explanation view showing an embodiment of a shape inspection apparatus.

FIG. 3 is an explanation view showing an embodiment of inspection apparatus.

Figure 4:
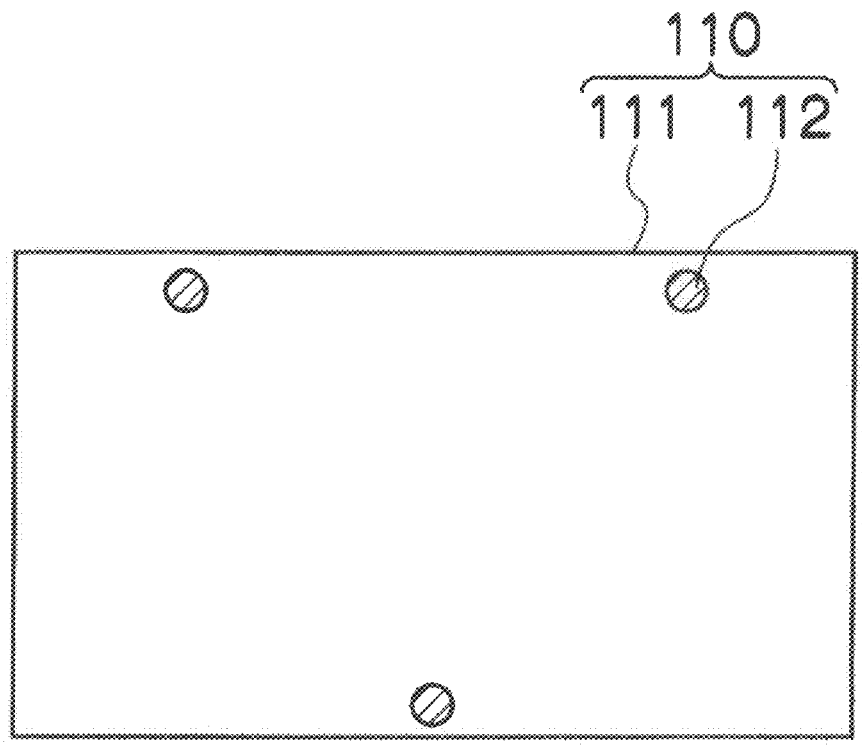
FIG. 4 is a plan view showing an actual measurement inspection stand (a view observed in the direction of arrows from the line II-II' in FIG. 3).

As shown in the figure, a universal inspection stand 110 has a base 111 having a rectangular shape in top view and three rods 112 attached to the base so as to protrude upwardly from the base to support a rear surface of a glass plate 1 (refer to FIG. 4). The three rods 112 are disposed at respective apexes of a triangle on a top face of the base 111. A pad made of e.g. a resin is attached to the leading edge of each rod 112 to receive the glass plate 1. By using three rods 112 and appropriately adjusting the arrangement and the lengths of the rods 112, it is possible to surely support a rear surface of the glass plate 1 regardless of the shape of the glass plate 1.

Above the glass plate 1, a camera 121 for capturing an image of a surface of the glass plate 1 is disposed. Further, the inspection apparatus has a computer 120 constituted by a personal computer or a workstation, etc. for carrying out image processing of the captured image. To the computer 120, various types of input/output devices are connected, and for example, the computer 120 is provided with a keyboard 122, a display 123 such as an LCD and a memory device 124 such as a hard disk drive. In the memory device 124, the data of captured images and a program for carrying out image processing or drive control of the camera, etc. are stored.

In the present invention, it is possible to measure the surface shape by a known method accommodated to an object to be measured. In this section, the method for measuring a surface shape is described by using as an example a method of actually measuring a surface shape of an object to be measured by a coordinate image capturing using an optical system and XYZ coordinate system.

Figure 5:
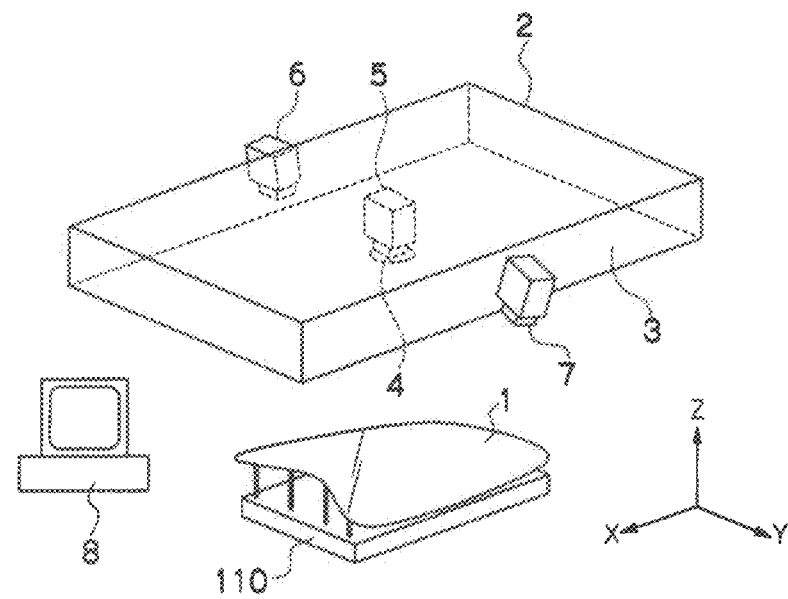
FIG. 5 is an explanation view showing an embodiment of the shape measurement system according to the present invention.

FIG. 5 is an explanation view showing the basic construction of a shape inspection apparatus. As shown in the figure, a plane light source 2 is disposed above a glass plate 1 having a mirror surface such as a glass for automobiles. A color pattern 3 is attached on an emission surface of the plane light source 2. In order to capture a reflection image of the color pattern 3 projected on the glass plate 1, one main camera and at least one sub color camera are disposed. These color cameras correspond to a camera 121 of FIG. 3. The number of color cameras is not limited, but a main color camera 5 and a sub color cameras 6 and 7, namely total three color cameras, are employed in this example. The main camera 5 is disposed inside the plane light source 2, to capture a reflection image of the color pattern 3 projected on the glass plate 1 through a hole 4 opening in the color pattern 3. The sub color cameras 6 and 7 are disposed outside the plane light source 2, to capture images reflected by the glass plate 1. A computer 8 such as a personal computer is connected with the color cameras 5, 6 and 7 and analyzes reflected images captured by these cameras by a known image processing technique to obtain the shape of the glass plate 1. The optical system and the object to be measured are assumed to be placed in an XYZ coordinate system wherein Z axis is in the vertical direction. Sides of the plane light source 2 are assumed to be parallel with X axis and Y axis respectively. Hereinafter, the XYZ coordinate system for describing the arrangement of the entire optical system is called as a global coordinate system and coordinates in the global coordinate system are called as global coordinates.

As the plane light source 2, one having a plurality of fluorescent lamps arranged in a casing, whose emission surface is covered by a glass plate, is employed. As the color pattern 3 pasted to the emission surface, a transparent or light-scattering resin film having a color pattern printed (by e.g. inkjet printing) thereon, may be employed. The color pattern 3 may be pasted on a surface of single cover glass or may be sandwiched by two cover glasses. The brightness of the plane light source 2 is preferably as uniform as possible, and for this purpose, arrangement of the fluorescent lamps in the casing is devised. Further, the resin film to be used as the color pattern is preferably made of not a transparent material but a light-diffusion-transmitting material. By such a material, unevenness of brightness of the plane light source 2 is reduced. The color cameras 5, 6 and 7 are not particularly limited so long as they are of area camera types.

Figure 6:
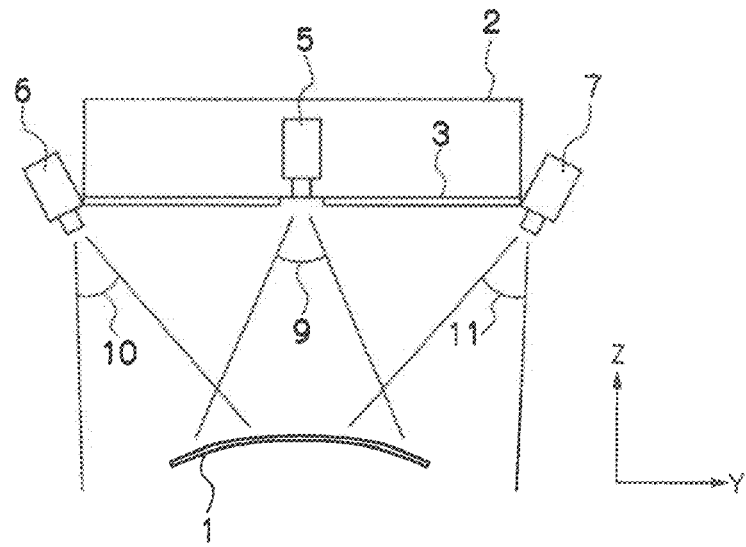
FIG. 6 is a cross sectional view showing an optical system for shape measurement.

FIG. 6 is a partial cross-sectional side view of the optical system by YZ plane, showing the relation of positions and view fields of three color cameras. The main color camera 5 points to vertically downward direction and captures a reflection image in the range of a view field 9. The sub color camera 6 captures a reflection image in the range of a view field 10, and is positioned so that a part of the view field 10 overlaps a part of the view field 9 on the glass plate 1. In the same manner, the sub color camera 7 captures a reflection image in the range of a view field 11, and is positioned so that a part of the view field 11 overlaps a part of the view field 9 on the glass plate 1. These three color cameras are fixed in the global coordinate system, and their positions and directions can be obtained as known information.

Figure 7:
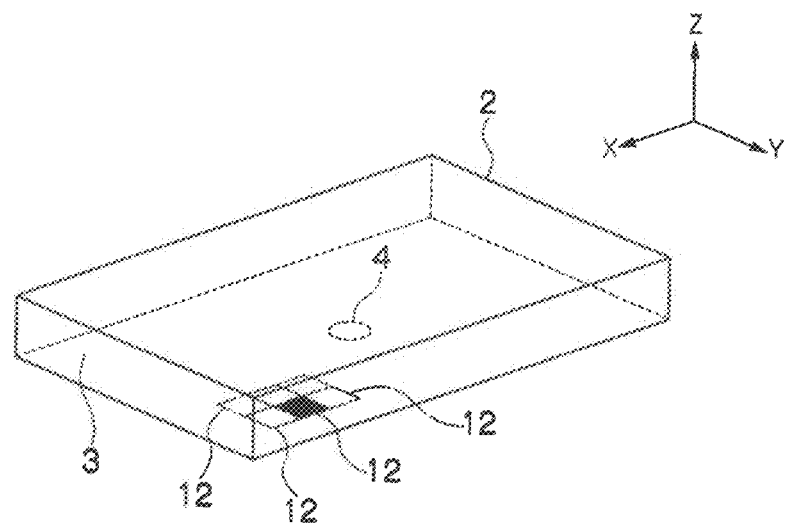
FIG. 7 is an explanation view schematically showing a color pattern.

FIG. 7 is an explanation view of the color pattern 3. As basic pattern 12 is a unit, the color pattern 3 is constituted by a plurality of basic patterns 12 that are densely arranged so as not to overlap with each other. Accordingly, in the color pattern 3, the basic pattern 12 appears periodically in both vertical and lateral directions.

Figure 8:
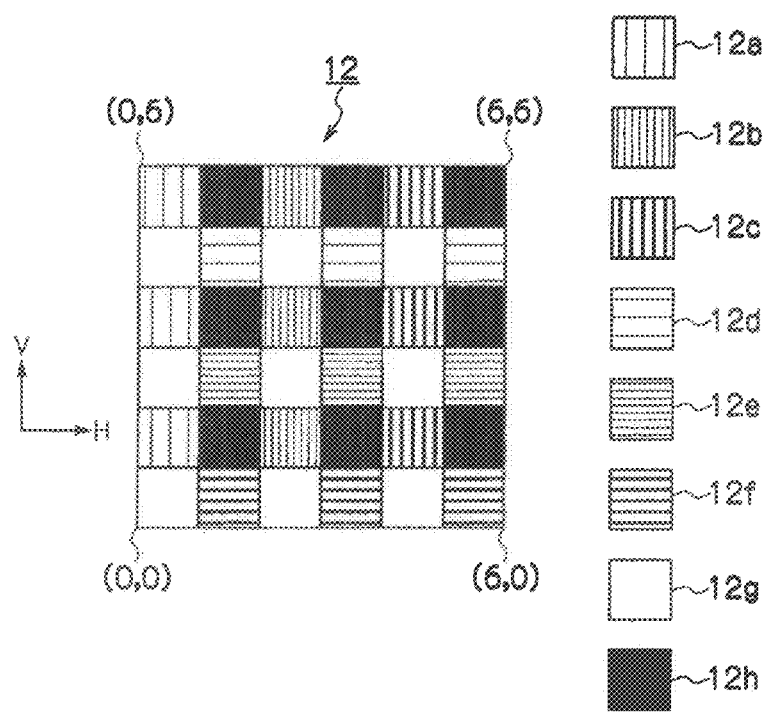
FIG. 8 is a plan view showing a basic pattern.

FIG. 8 is a detailed explanation view of the basic pattern 12. The basic pattern 12 is constituted by 6×6 of fine square patterns, and each of the fine square patterns has any one of eight colors 12a to 12h. Further, as shown in FIG. 8, basic patterns 12 are associated with a local coordinate system having lateral and vertical directions. Hereinafter, coordinates of a point in a basic pattern 12 are called as local coordinates. In the case of basic pattern shown in FIG. 8, components of the local coordinates each takes a non-dimensional value of from 0 to 6. By these local coordinates, the position of optional point in the basic pattern 12 can be described. For example, in the basic pattern 12 of FIG. 8, a lower left point is described as (0,0), the center point is described as (3,3) and the upper right point is described as (6,6). Each component of local coordinate is not limited to an integer but the local coordinate can be described as e.g. (2,5, 3.3). Hereinafter, the position of a point in a basic pattern 12 is called as local coordinate.

Eight colors constituting the basic pattern 12 are adjusted as follows in advance.

Figure 9:
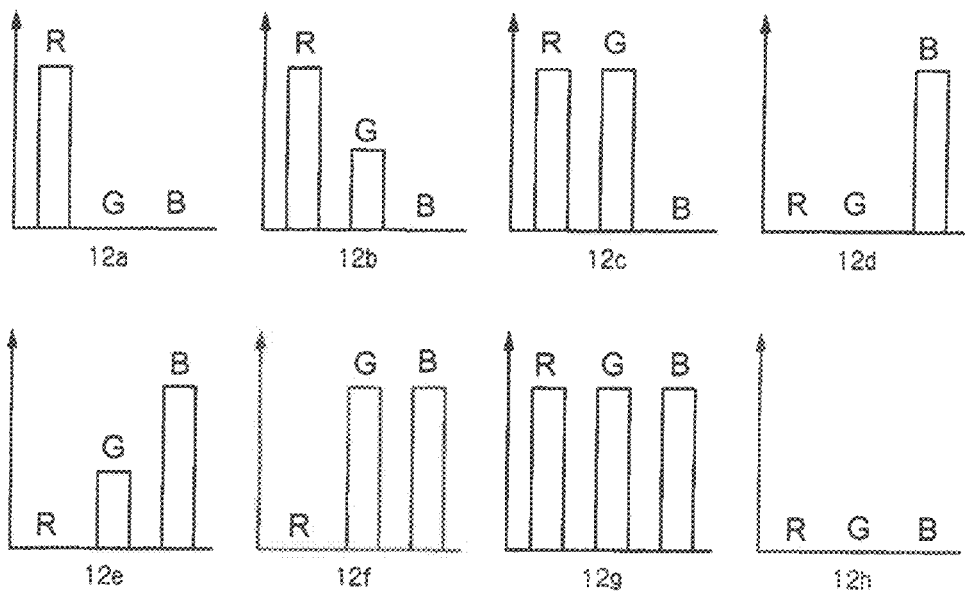
FIG. 9 is graphs showing intensities of a red component, a green component and a blue component of each of eight colors constituting the basic pattern captured by a color camera.

FIG. 9 shows a red component, a green component and a blue component of an image of each of eight colors constituting the basic pattern captured by a color camera. The vertical axis of each graph shows the intensity of the color components. Colors 12a, 12b and 12c are adjusted so as not to contain blue component and have red components of the same intensity. The difference among the colors 12a, 12b and 12c resides in the intensity of green component. In the same manner, colors 12d, 12e and 12f are adjusted so as not to contain red component and have blue component of the same intensity. The difference among the colors 12d, 12e and 12f resides in the intensity of green component. A color 12g has red, green and blue components having the same strength, and a color 12h has red, green and blue components of no intensity. Here, the intensities of red and blue components of the color 12g are the same as those of red components of the colors 12a, 12b and 12c and the same as blue components of the colors 12d, 12e and 12f.

Figure 10:
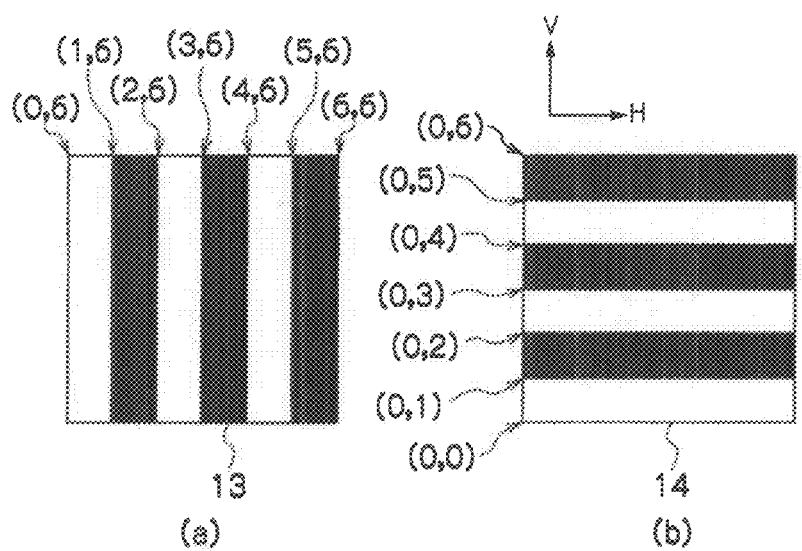
FIG. 10(*a*) is a plan view showing a stripe pattern appeared when the red component is observed.

By adjusting the eight colors constituting the basic pattern 12 as described above, it is possible to contain two stripe patterns being at right angles to each other in the basic pattern 12. When the image of the basic pattern 12 is captured by a color camera and only its red component is observed, a stripe pattern 13 appears as shown in FIG. 10(a). In the same manner, when only its blue component is observed, a stripe pattern 14 appears as shown in FIG. 10(b). Thus, according to this embodiment, although a single color pattern is used, it is possible to obtain two stripe patterns being at right angles to each other by observing different color components. As evident also from FIG. 10, the stripe pattern 13 corresponds to the local coordinate in H direction and the stripe pattern 14 corresponds to the local coordinate in V direction. The stripe patterns 13 and 14 preferably perpendicular to each other but they may be at another angle and the angle may be any angle so long as the directions are not parallel with each other.

By the above method, the shape data of the glass plate 1 can be obtained.

Next, based on the above mentioned shape data of the glass plate 1, that is, based on the actual measurement shape data Y1 of the glass plate 1, the position data on the four supporting positions defined by virtual spacers is obtained as shown in FIG. 2 (step (S) 408).

Next, as described above, $\Delta C2 = C2_x - C1_x$ and $\Delta C3 = C3_x - C1_x$ at each of the virtual four supporting positions are calculated (step (S) 404), and subsequently, as described above, $\Delta Y1 = Y1_x - C1_x$ at each of the virtual four supporting positions is calculated (step (S) 405). Here, x is a suffix showing the supporting positions and x is 1, 2, 3 or 4.

Next, as shown in FIG. 11, the degree of agreement of signs between the vector $\Delta Y1$ ($\Delta Y1_1$ to $\Delta Y1_4$) and $\Delta C2$ ($\Delta C2_1$ to $\Delta C2_4$) or $\Delta C3$ ($\Delta C3_1$ to $\Delta C3_4$) is evaluated, to judge which of the patterns of C2 and C3 is closer to Y1, that is, to judge the unique weight pattern to determine the sign of vector (step (S) 409). In FIG. 11, Y1 is close to the pattern of C2. Further, in the Table of FIG. 14, since the signs of $\Delta Y1$ and $\Delta C3$ are the same, Y1 is close to the pattern of C3.

When Y1 is close to the pattern of C2, the degree of movement of weight distribution can be obtained from the ratio between $\Delta Y1$ ($\Delta Y1_1$ to $Y1_4$) and $\Delta C2$ ($\Delta C2_1$ to $C2_4$), and when Y1 is close to the pattern of C3, the degree of movement of weight distribution can be obtained from the ratio between $\Delta Y1$ ($\Delta Y1_1$ to $Y1_4$) and $\Delta C3$ ($\Delta C3_1$ to $C3_4$). Namely, the average r of the ratios of virtual four supporting positions to respective positions, is obtained (step (S) 410). The Table of FIG. 15 shows the ratio between $\Delta Y1$ and $\Delta C3$ at each of four points, and shows that the average r of the ratios is 53.1%.

Next, by using the average r of the ratios obtained above, a correction amount R at each of the virtual supporting positions is obtained (step (S) 411). The correction amount R is $R = r \cdot (C3 - C1)$ when the weight distribution is close to the pattern of C3, and the correction amount R is $R = r \cdot (C2 - C1)$ when the weight distribution is close to the pattern of C2. FIG. 16 shows the correction amount $R = r \cdot (C3 - C1)$ at each of evaluation points 1 to 23 including inspection positions available for judging the quality of a glass plate to be inspected when the weight distribution is close to the pattern of C2.

Next, a value corresponding to a difference Y2−A between an actual measurement data Y2 on a desired actual measurement inspection stand of four-point supporting type (present inspection stand) and a glass plate having a design shape supported on a desired four-point supporting type actual measurement inspection stand, that is the first design data A, is calculated from the actual measurement data Y1 and the correction amount R that is r(C3−C1) or r(C2−C1) selected according to closeness of Y1 to the pattern of C2 or C3, that is, according to the unique weight pattern (step (S) 412).

As described above, by the method and program for inspecting the shape of a glass plate of this embodiment, it is possible to inspect by predicting the shape of a glass plate on a four-point supporting type actual measurement inspection stand from the shape of a glass plate on a three-point supporting type universal inspection stand. Here, the inspection positions and the number of the inspection positions may be appropriately determined considering the feature of the product shape or the quality specification of a glass plate to be inspected. Further, at each of these inspection points, the correction amount of R may take a positive value or a negative value. For example, FIG. 17 shows a value corresponding to the difference Y2−A between the actual measurement data Y2 and the first design data A, obtained by subtracting a correction amount R=r(C3−C1) from Y1−C1 at each of evaluation points 1 to 23 on a four-point supporting type actual measurement inspection stand.

Next, a value corresponding the difference Y2−A, obtained in step (S) 412, between the actual measurement data Y2 of the glass plate and the first design data A, is compared with the inspection standard at predetermined inspection positions (step (S) 413). Here, the inspection standard in the present invention may be determined as a tolerable range of a numerical value showing the shape at predetermined inspection positions particularly in the thickness direction of the glass plate.

The value corresponding to the difference Y2−A between the actual measurement data Y2 and the first design data A at the inspection positions thus obtained is compared with the inspection standard to judge the shape quality, and to output an inspection result. By the present invention, it becomes possible to apply a quality standard, that is for an inspection on a four-point type actual measurement inspection stand employed heretofore, to a measurement result obtained by measuring the shape of a glass plate placed on a three-point type universal inspection stand, to judge the quality. Accordingly, it becomes possible to replace the shape inspection method using a four-point supporting type actual measurement inspection stand dedicated to each product model for a shape inspection method using a three-point supporting type universal inspection stand applicable to various product models without changing the conventional quality standard or quality agreement values with customers. This merit is common to the following quality inspection method.

The above mentioned quality inspection method of a glass plate is an inspection method requiring one main weight pattern and two sub weight patterns. There is a case of one main weight pattern (first weight pattern) and one sub weight pattern (second weight pattern) depending on the shape of the glass plate.

Figure 18:
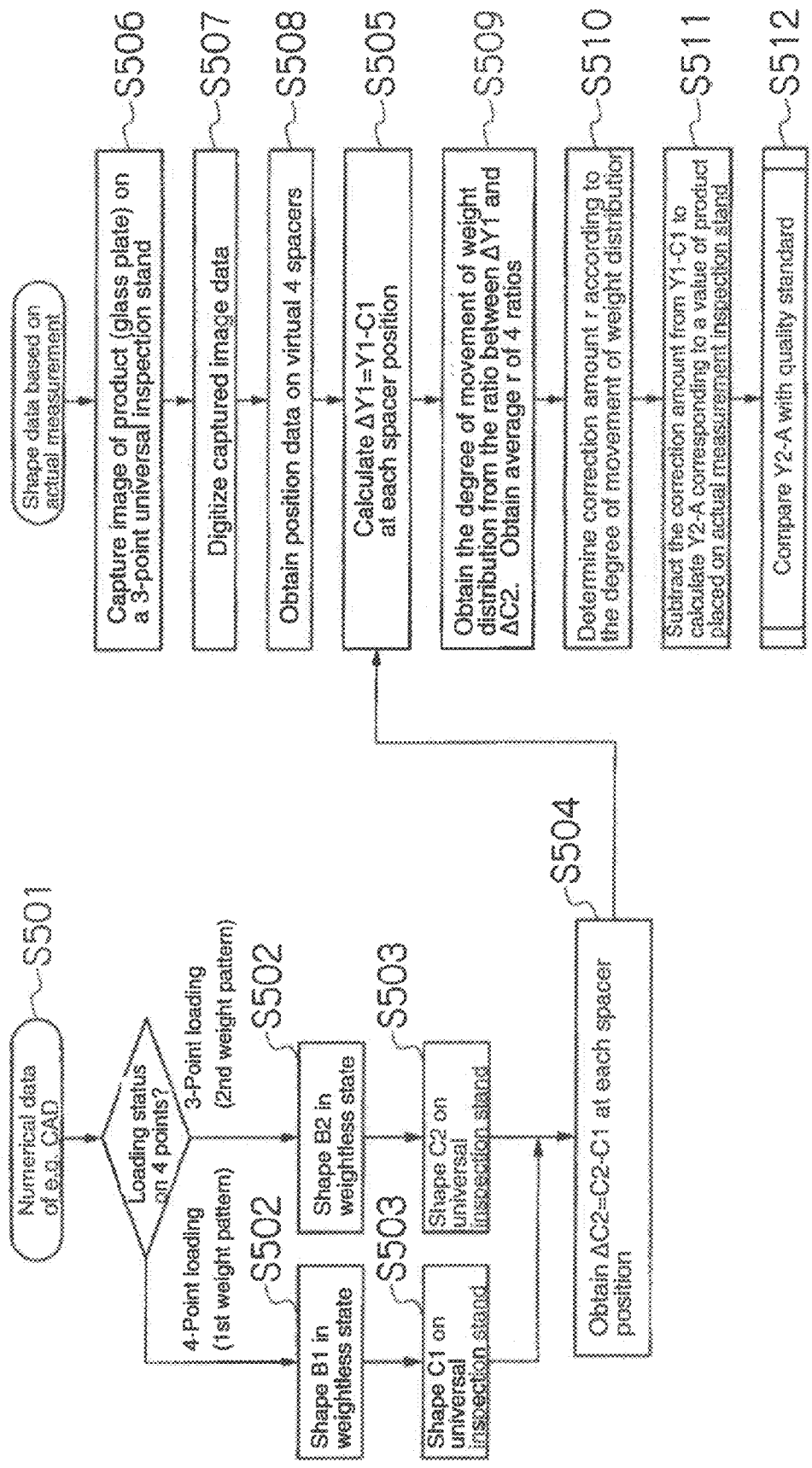
FIG. 18 is a flowchart showing the process of the quality inspection method of an embodiment.

In a quality inspection method of a glass plate having such a weight pattern, as shown in the flowchart of FIG. 18, first and second weight patterns of a design (CAD) data of a glass plate in a state that it is supported on a desired four-point supporting type actual measurement inspection stand is prepared (step (S) 501), a design shape data (second design data B1 and B2) of a glass plate A in weightless state is calculated from the first and second weight patterns (step (S) 502), and based on the design shape data of the glass plate A in weightless state, a design shape data (third design data C1 and C2) of the glass plate A in a state that it is placed on a three-point supporting type universal inspection stand is calculated (step (S) 503).

Next, as in step (S) 504, position data $C1_1$ to $C1_4$ and $C2_1$ to $C2_4$ at four actual measurement supporting positions of each of the third design data C1 and C2 for each weighting pattern is calculated to obtain a virtual error $\Delta C2 = C2 - C1$ at each of the four supporting positions supported by spacers. Foregoing data has been obtained in advance.

Meanwhile, position data $Y1_1$ to $Y1_4$ of a glass plate to be measured can be obtained by a step of capturing an image of a product glass plate supported on a three-point supporting type universal inspection stand (step (S) 506), a step of converting the captured image data into numerical data (step (S) 507) and a step of obtaining the position data on virtual four supporting positions (step (S) 508). Thereafter, as in step (S) 505, a virtual error $\Delta Y1 = Y1 - C1$ at each of four supporting positions is obtained.

Figures 19, 20:
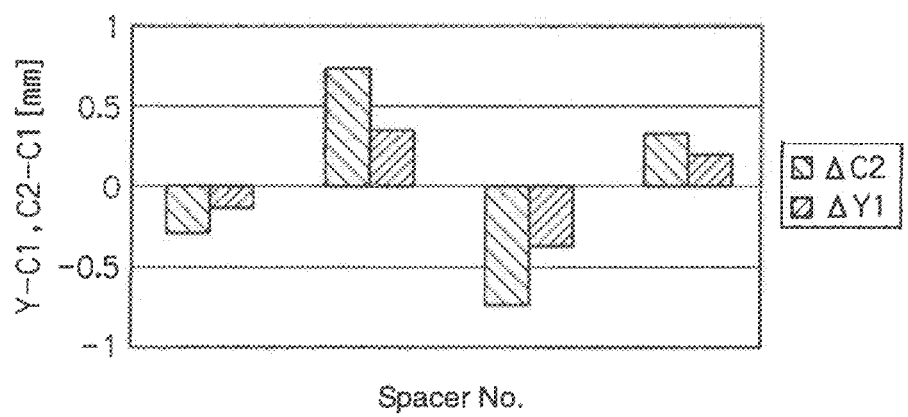
FIG. 19 is a table showing the average of the ratios of Y1 to $\Delta C2$ at four supporting points.
FIG. 20 is an explanation view showing that Y1 is closer to the pattern of C2.

Next, the degree of movement of weight distribution is obtained from the ratio between $\Delta Y1$ ($\Delta Y1_1$ to $Y1_4$) and $\Delta C2$ ($\Delta C2_1$ to $C2_4$), and the average r of four ratios at four virtual supporting positions is calculated (step (S) 509). The table of FIG. 19 and FIG. 20 show the ratio between $\Delta Y1$ and $\Delta C2$ at each of the four points, and show that the average r of the ratios is 0.505109.

Next, from the degree of movement of weight distribution, a correction amount r (C2−C1) of a weight distribution close to the pattern of C2 is obtained (step (S) 510).

Next, the above correction amount r (C2−C1) is subtracted from Y1−C1 to calculate a value corresponding to a difference Y2−A between a shape data Y2 on a desired four-point supporting type actual measurement inspection stand (present inspection stand) and the first design data A (step (S) 511).

As described above, by the shape inspection method for a glass plate of this embodiment, it is possible to inspect by predicting the shape of a glass plate on a four-point supporting type actual measurement inspection stand from the shape of a glass plate on a three-point supporting type universal inspection stand.

Next, the value corresponding to the difference Y2−A, obtained in step (S) 511, between the shape data Y2 of a glass plate and the first design data A is compared with a quality standard at predetermined inspection positions (step (S) 512).

Next, from the comparison result of the value corresponding to the difference Y2−A between the actual measurement data Y2 and the first design data A with the inspection standard, judgment of the shape quality is carried out and the inspection result is output.

FIG. 19 shows that Y1 is always close to the pattern of C2 at each of the four supporting positions 1 to 4.

It is understandable that in the case of this glass plate, the weight distribution has moved in the direction of the pattern of C2, and its degree is 50.5%.

INDUSTRIAL APPLICABILITY

As described above, the present invention provides a quality inspection method, an inspection apparatus and an inspection program suitable for shape inspection of an automotive window glass. Further, by calculating a virtual design data on an actual measurement inspection stand from a design data of a glass plate, it is possible to calculate the shape of the glass plate.

It is apparent that the present invention is applicable not only to an inspection of window glass of an automotive application but also to those of railroad vehicles, airplanes, boats and buildings, etc. Further, the present invention is applicable not only to inspections of glass plates but also to inspections of other mirror surface objects, plate-shaped objects and lenses, etc.

This application is a continuation of PCT Application No. PCT/JP2010/051528, filed on Feb. 3, 2010, which is based upon and claims the benefit of priority from Japanese Patent Application No. 2009-022839 filed on Feb. 3, 2009. The contents of those applications are incorporated herein by reference in its entirety.

REFERENCE SYMBOLS

1: Glass plate
2: Plane light source
3: Color pattern
4: Hole through color pattern
5: Main color camera
6, 7: Sub color camera
8: Computer
9: View field of main color camera
10, 11: View field of sub color camera
12: Basic pattern constituting a color pattern
13: First stripe pattern in a basic pattern
14: Second stripe pattern in a basic pattern
110: Actual measurement inspection stand
111: Substrate
112: Rod
120: Computer
121: Camera
122: Keyboard
123: Display
124: Memory device

What is claimed is:

1. A method for inspecting the quality of a glass plate, which is a method of judging the quality from a design data of a glass plate attached for use as a window glass, and a shape data of a measured glass plate; the method comprising:

a first step of setting a first design data A representing the shape of the attached glass plate, a first weight pattern being one main weight pattern and second and third weight patterns being sub weight patterns on four actual measurement weight supporting points corresponding to weight supporting points of the actual measurement inspection stand selected according to the shape of the attached glass plate;

a second step of calculating second design data B, that are B1, B2 and B3 corresponding to the first, second and third weight patterns, respectively, of the shape of the glass plate in weightless state in which effect of flexion due to gravity is excluded, based on the first design data A and the first, second and third weight patterns;

a third step of calculating third design data C, that are C1, C2 and C3 corresponding to the first, second and third weight patterns, respectively, of the shape of the glass plate in a state that the glass plate is virtually placed on a universal inspection stand having three universal supporting points, based on the second design data B;

a fourth step of calculating the position data $C1_1$ to $C1_4$, $C2_1$ to $C2_4$ and $C3_1$ to $C3_4$ of four actual measurement supporting points of the third design data C corresponding to the weight patterns;

a fifth step of calculating two position vectors $\Delta C2=C2_x-C1_x$ and $\Delta C3=C3_x-C1_x$ (where x is 1, 2, 3 or 4 that is a suffix representing a supporting position; this rule is applied hereinafter) from the position data $C1_x$, $C2_x$ and $C3_x$;

a sixth step of measuring a first actual measurement data Y1 of a glass plate to be measured that is placed on a universal inspection stand having three universal supporting points;

a seventh step of calculating position data $Y1_1$ to $Y1_4$ of four actual measurement supporting points in the first actual measurement data Y1;

an eighth step of calculating a position vector $\Delta Y1=Y1_x-C1_x$ from the position data $C1_x$ and $Y1_x$;

a ninth step of comparing $\Delta Y1$ with $\Delta C2$ and $\Delta C3$, judging which of the second weight pattern and the third weight pattern is closer to the weight pattern of Y1 based on the degree of agreement of the signs of the vectors to judge a unique weight pattern and determining the sign of the vector;

a tenth step of calculating the ratio r of $\Delta Y1$ to the position vector $\Delta C2$ or $\Delta C3$ that is determined by the unique weight pattern;

an eleventh step of obtaining a shape correction amount R=r(C2−C1) or a shape correction amount R=r(C3−C1) for obtaining position data of the measurement points in a case of virtually placing the glass plate to be inspected on the actual measurement inspection stand, based on the first actual measurement data Y1 and the unique weight pattern;

a twelfth step of calculating a value corresponding to a difference Y2−A between a second actual measurement data Y2 and the first design data A at a desired inspection point of the glass plate to be inspected placed on the actual measurement inspection stand, by subtracting the shape correction amount R from the difference Y1−C1 obtained by subtracting the third design data C1 of the glass plate that is virtually placed with the first weight pattern, that is the main weight pattern, from the first actual measurement data Y1; and a thirteenth step of judging the quality of the glass plate based on the value corresponding to Y2−A calculated above and a quality standard.

2. A method for inspecting the quality of a glass plate, which is a method of judging the quality from a design data of a glass plate attached for use as a window glass, and a shape data of a measured glass plate; the method comprising:

a first step of setting a first design data A representing the shape of the attached glass plate, a first weight pattern being one main weight pattern and a second weight pattern being a sub weight pattern on four actual measurement weight supporting points corresponding to weight supporting points of the actual measurement inspection stand selected according to the shape of the attached glass plate;

a second step of calculating second design data B, that are B1 and B2 corresponding to the first and second weight patterns, respectively, of the shape of the glass plate in weightless state in which effect of flexion due to gravity is excluded, based on the first design data A and the first and second weight patterns;

a third step of calculating third design data C, that are C1 and C2 corresponding to the first and second weight patterns, respectively, of the shape of the glass plate in a state that the glass plate is virtually placed on a universal inspection stand having three universal supporting points, based on the second design data B;

a fourth step of calculating the position data $C1_1$ to $C1_4$ and $C2_1$ to $C2_4$ of four actual measurement supporting points of the third design data C corresponding to the weight patterns;

a fifth step of calculating a position vector $\Delta C2 = C2_x - C1_x$ (where x is 1, 2, 3 or 4 that is a suffix representing a supporting position; this rule is applied hereinafter) from the position data $C1_x$ and $C2_x$;

a sixth step of measuring a first actual measurement data Y1 of a glass plate to be measured that is placed on a universal inspection stand having three universal supporting points;

a seventh step of calculating position data $Y1_1$ to $Y1_4$ of four actual measurement supporting points in the first actual measurement data Y1;

an eighth step of calculating a position vector $\Delta Y1 = Y1_x - C1_x$ from the position data $C1_x$ and $Y1_x$;

a ninth step of calculating a ratio r of $\Delta Y1$ to $\Delta C2$;

a tenth step of obtaining a shape correction amount R=r (C2−C1) for obtaining position data of the measurement points in a case of virtually placing the glass plate to be inspected on the actual measurement inspection stand, based on the first actual measurement data Y1 and the second weight pattern;

an eleventh step of calculating a value corresponding to a difference Y2−A between a second actual measurement data Y2 and the first design data A at a desired inspection point of the glass plate to be inspected placed on the actual measurement inspection stand, by subtracting the shape correction amount R from the difference Y1−C1 obtained by subtracting the third design data C1 of the glass plate that is virtually placed with the first weight pattern, that is the main weight pattern from the first actual measurement data Y1; and a twelfth step of judging the quality of the glass plate based on the value corresponding to Y2−A calculated above and a quality standard.

3. The method for inspecting the quality of a glass plate according to claim 1, wherein the main first weight pattern is one wherein weights are applied on all of four supporting points of the actual measurement inspection stand, and the sub weight patterns include at least one weight distribution wherein weights are applied on only three supporting points of the four supporting points.

4. The method for inspecting the quality of a glass plate according to claim 2, wherein the main first weight pattern is one wherein weights are applied on all of four supporting points of the actual measurement inspection stand, and the sub weight patterns include at least one weight distribution wherein weights are applied on only three supporting points of the four supporting points.

5. The method for inspecting the quality of a glass plate according to claim 1, wherein the glass plate is an automotive window glass.

6. The method for inspecting the quality of a glass plate according to claim 2, wherein the glass plate is an automotive window glass.

7. A method for measuring the shape of a glass plate, which is a method for calculating a shape data of a glass plate placed on an actual measurement inspection stand by using a design data of the glass plate attached for use as a window glass; the method comprising:

a first step of setting a first design data A representing the shape of the attached glass plate, a first weight pattern being one main weight pattern and second and third weight patterns being sub weight patterns on four actual measurement weight supporting points corresponding to weight supporting points of the actual measurement inspection stand selected according to the shape of the attached glass plate;

a second step of calculating second design data B, that are B1, B2 and B3 corresponding to the first, second and third weight patterns, respectively, of the shape of the glass plate in weightless state in which effect of flexion due to gravity is excluded, based on the first design data A and the first, second and third weight patterns;

a third step of calculating third design data C, that are C1, C2 and C3 corresponding to the first, second and third weight patterns, respectively, of the shape of the glass plate in a state that the glass plate is virtually placed on a universal inspection stand having three universal supporting points, based on the second design data B;

a fourth step of calculating the position data $C1_1$ to $C1_4$, $C2_1$ to $C2_4$ and $C3_1$ to $C3_4$ of four actual measurement supporting points of the third design data C corresponding to the weight patterns;

a fifth step of calculating two position vectors $\Delta C2 = C2_x - C1_x$ and $\Delta C3 = C3_x - C1_x$ (where x is 1, 2, 3 or 4 that is a suffix representing a supporting position; this rule is applied hereinafter) from the position data $C1_x$, $C2_x$ and $C3_x$;

a sixth step of measuring a first actual measurement data Y1 of a glass plate to be measured that is placed on a universal inspection stand having three universal supporting points;

a seventh step of calculating position data $Y1_1$ to $Y1_4$ of four actual measurement supporting points in the first actual measurement data Y1;

an eighth step of calculating a position vector $\Delta Y1 = Y1_x - C1_x$ from the position data $C1_x$ and a ninth step of comparing $\Delta Y1$ with $\Delta C2$ and $\Delta C3$, judging which of the second weight pattern and the third weight pattern is closer to the weight pattern of Y1 based on the degree of agreement of the signs of the vectors to judge a unique weight pattern and determining the sign of the vector, a tenth step of calculating the ratio r of $\Delta Y1$ to the position vector $\Delta C2$ or $\Delta C3$ that is determined by the unique weight pattern;

an eleventh step of obtaining a shape correction amount $R = r(C2 - C1)$ or a shape correction amount $R = r(C3 - C1)$ for obtaining position data of the measurement-points in a case of virtually placing the glass plate to be inspected on the actual measurement inspection stand, based on the first actual measurement data Y1 and the unique weight pattern; and a twelfth step of calculating a second actual measurement data Y2 at a desired inspection point of the glass plate to be inspected placed on the actual measurement inspection stand, by subtracting the third design data C1 of the glass plate that is virtually placed with the first weight pattern, that is the main weight pattern, from the first actual measurement data Y1 to obtain the difference Y1−C1, adding the first design data A to the difference Y1−C1 and subtracting the shape correction amount R from Y1−C1+A.

8. A method for measuring the shape of a glass plate, which is a method for calculating a shape data of a glass plate placed on an actual measurement inspection stand by using a design data of the glass plate attached for use as a window glass; the method comprising:

a first step of setting a first design data A representing the shape of the attached glass plate, a first weight pattern being one main weight pattern and a second weight pattern being a sub weight pattern on four actual measurement weight supporting points corresponding to weight supporting points of the actual measurement inspection stand selected according to the shape of the attached glass plate;

a second step of calculating second design data B, that are B1 and B2 corresponding to the first and second weight patterns, respectively, of the shape of the glass plate in weightless state in which effect of flexion due to gravity is excluded, based on the first design data A and the first and second weight patterns;

a third step of calculating third design data C, that are C1 and C2 corresponding to the first and second weight patterns, respectively, of the shape of the glass plate in a state that the glass plate is virtually placed on a universal inspection stand having three universal supporting points, based on the second design data B;

a fourth step of calculating the position data $C1_1$ to $C1_4$ and $C2_1$ to $C2_4$ of four actual measurement supporting points of the third design data C corresponding to the weight patterns;

a fifth step of calculating a position vector $\Delta C2 = C2_x - C1_x$ (where x is 1, 2, 3 or 4 that is a suffix representing a supporting position; this rule is applied hereinafter) from the position data $C1_x$ and $C2_x$;

a sixth step of measuring a first actual measurement data Y1 of a glass plate to be measured that is placed on a universal inspection stand having three universal supporting points;

a seventh step of calculating position data $Y1_1$ to $Y1_4$ of four actual measurement supporting points in the first actual measurement data Y1;

an eighth step of calculating a position vector $\Delta Y1 = Y1_x - C1_x$ from the position data $C1_x$ and $Y1_x$;

a ninth step of calculating a ratio r of $\Delta Y1$ to $\Delta C2$;

a tenth step of obtaining a shape correction amount $R = r(C2 - C1)$ for obtaining position data of the measurement points in a case of virtually placing the glass plate to be inspected on the actual measurement inspection stand, based on the first actual measurement data Y1 and the second weight pattern; and a eleventh step of calculating a second actual measurement data Y2 at a desired inspection point of the glass plate to be inspected placed on the actual measurement inspection stand, by subtracting the third design data C1 of the glass plate that is virtually placed with the first weight pattern, that is the main weight pattern, from the first actual measurement data Y1 to obtain the difference Y1−C1, adding the first design data A to the difference Y1−C1 and subtracting the shape correction amount R from Y1−C1+A.

9. A process for producing a glass plate, comprising carrying out a feedback control using a judgment result of the method for inspecting the quality of a glass plate as defined in claim 1.

10. A process for producing a glass plate, comprising carrying out a feedback control using a judgment result of the method for inspecting the quality of a glass plate as defined in claim 2.

* * * * *